UNITED STATES PATENT OFFICE.

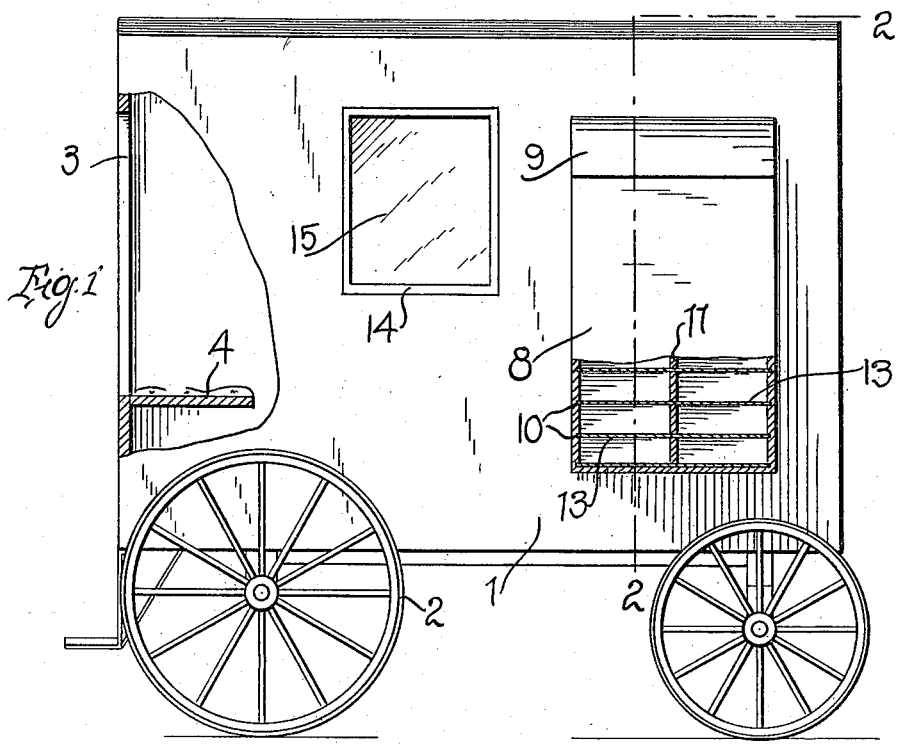
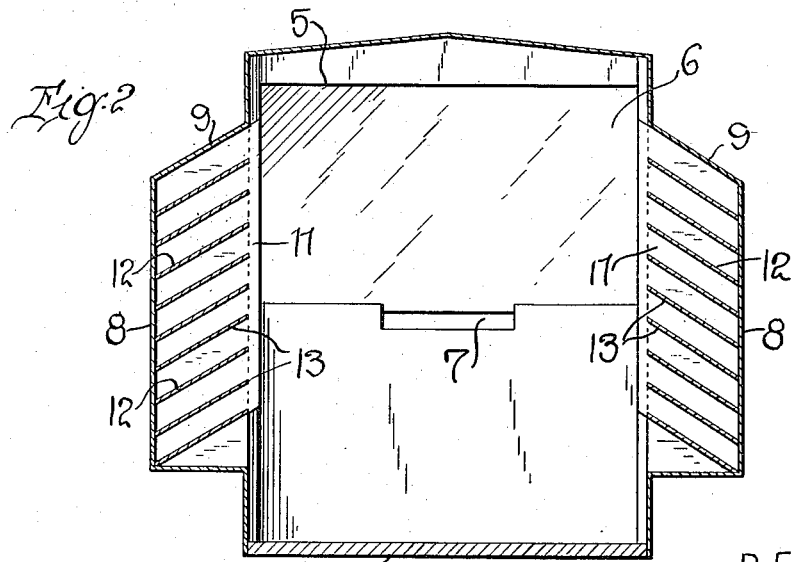

BENJAMIN F. HAWKINS, OF SULPHUR, KENTUCKY, ASSIGNOR OF ONE-THIRD TO LEWIS E. MORRIS AND ONE-THIRD TO CHARLES R. MARTIN, BOTH OF SULPHUR, KENTUCKY.

MAIL-WAGON.

1,195,676.  Specification of Letters Patent.  Patented Aug. 22, 1916.

Application filed August 29, 1914. Serial No. 859,244.

*To all whom it may concern:*

Be it known that I, BENJAMIN F. HAWKINS, a citizen of the United States, residing at Sulphur, in the county of Henry and State of Kentucky, have invented certain new and useful Improvements in Mail-Wagons, of which the following is a specification, reference being had to the accompanying drawings.

This invention relates to new and useful improvements in vehicles and more particularly to what will be hereinafter known as a mail car, the main object of the present invention being the provision of a mail car having suitable cabinets carried thereby which are arranged within the side walls of the body in such a manner as to provide for a larger amount of room than is generally given in a vehicle of this character.

Another object of the present invention is the provision of a device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a side elevation of a mail wagon constructed in accordance with my invention; and Fig. 2 is a vertical sectional view taken on the line 2—2, Fig. 1.

Referring more particularly to the drawing, 1 indicates a substantially rectangular body of the vehicle which is mounted upon a wheeled truck 2, said body being formed of any suitable material, such as matched lumber or sheet metal. The body 1 is provided at its rear end with a suitable door opening 3 and is provided just inside the door opening with the driver's seat 4. The forward end of the body 1 is provided with an opening 5 having a glass panel 6 arranged therein for a purpose which is believed to be self-evident. The lower wall of the opening 5 is provided with a recess 7 for the reception of the driving reins, which extend therethrough and rearwardly to the inner end of the vehicle where they may be readily accessible to the driver, whose position is upon the seat 4.

The body 1 is provided upon each side thereof at the forward end with an offset portion 8 which extends outwardly and is provided with a downwardly inclined top 9 whereby the water or snow will not accumulate thereon but will be directed off entirely from the body. These offset portions form suitable cabinets which are preferably constructed of the same material as the body of the vehicle and are provided upon their inner sides with suitable grooves or guides 10 and further arranged within the central portion thereof is a dividing wall 11 which is provided with open end recesses 12 extending inwardly from the outer vertical edge thereof and disposed substantially entirely across the wall to receive the shelves 13 which are removably arranged within the grooves 10 formed in the inner faces of the side walls of the offset portion 8. The inner vertical edge of the wall 11 above the lowermost shelf 13 projects slightly within the interior of the body 1 and the recesses 12 are of such a length as to permit the shelves 13 to be extended entirely across the lateral diameter of the offset portion 8. From this it will be apparent that the offsets 8 form suitable cabinets having shelves therein whereby letters or other mail matter may be retained therein and readily accessible to the driver and, at the same time, it will be noted that by having these offsets arranged upon the outer side of the body, it will provide for a greater amount of room upon the interior of the body than is generally the case with the mail wagons in use at the present time. The body 1 is provided upon opposite sides thereof and at a point adjacent the offsets with suitable window openings 14 in which the panes 15 are arranged to provide for sufficient light within the interior of the body.

It will be apparent from the foregoing taken in connection with the accompanying drawing, that I have provided a simple and durable mail wagon whereby a greater amount of room is provided within the interior of the wagon than with the vehicles in use at the present time. It will be noted that by having the offset portions 8 facing the interior of the wagon, the mail matter arranged within the same and upon the shelves will be readily accessible to the driver. It will be noted that in using this mail wagon upon rural routes, the carrier may arrange the mail matter upon the shelves 13 and place the name of the person to which this mail is directed upon the edge of the shelves 13 so that each day that he receives his mail from the main post-office, he can readily assort the same and arrange it in its proper pigeon-hole so that upon the delivery route, the carrier can quickly and readily obtain the mail from the pigeon-holes and place it in the proper boxes along the route. My improved mail wagon, as herein shown and described is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I claim is:—

1. A device of the character described including a hollow body, wheeled supports therefor, one of the walls of said body being offset to afford an outstanding compartment, a vertical dividing wall positioned within the offset portion and disposed transversely thereof to divide the compartment into a plurality of chambers, the inner vertical edge of the dividing wall being provided with a plurality of longitudinally spaced open end slots, and shelves insertible within the slots of the dividing wall, the ends of the shelves being operatively engaged with the adjacent side walls of the compartment.

2. A device of the character described including a hollow body, wheeled supports therefor, one of the walls of said body being offset to afford an outstanding compartment, a vertical dividing wall positioned within the offset portion and disposed transversely thereof to divide the compartment into a plurality of chambers, the inner vertical edge of the dividing wall being provided with a plurality of longitudinally spaced open end slots, and shelves insertible within the slots of the dividing wall, the ends of the shelves being operatively engaged with the adjacent side walls of the compartment, said dividing wall having its inner vertical edge extending within the hollow body.

In testimony whereof I hereunto affix my signature in the presence of two witnesses.

BENJAMIN F. HAWKINS.

Witnesses:
 LEWIS E. MORRIS,
 A. J. M. JOY.

Copies of this patent may be obtained for five cents each, by addressing the "Commissioner of Patents, Washington, D. C."